United States Patent
DiTrapani

(10) Patent No.: US 11,608,021 B2
(45) Date of Patent: Mar. 21, 2023

(54) CURTAIN AIRBAG MODULE WITH DEPLOYMENT RAMP AND BAG WRAP RETENTION FEATURES

(71) Applicant: ZF Passive Safety Systems US Inc., Washington, MI (US)

(72) Inventor: Joseph DiTrapani, Macomb, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/382,084

(22) Filed: Jul. 21, 2021

(65) Prior Publication Data
US 2023/0024450 A1 Jan. 26, 2023

(51) Int. Cl.
*B60R 21/213* (2011.01)
*B60R 21/232* (2011.01)

(52) U.S. Cl.
CPC .......... *B60R 21/213* (2013.01); *B60R 21/232* (2013.01)

(58) Field of Classification Search
CPC ... B60R 21/201; B60R 21/213; B60R 21/232; B60R 2021/161
See application file for complete search history.

(56) References Cited

U.S. PATENT DOCUMENTS

| | | | |
|---|---|---|---|
| 6,293,581 B1 * | 9/2001 | Saita | B60R 21/213 280/730.2 |
| 7,097,200 B2 * | 8/2006 | Wold | B60R 21/213 280/730.2 |
| 7,175,196 B2 * | 2/2007 | Boxey | B60R 21/232 280/730.2 |
| 7,182,366 B2 * | 2/2007 | Enriquez | B60R 21/213 280/730.2 |
| 7,328,911 B2 * | 2/2008 | Chapman | B60R 21/217 280/730.2 |
| 9,139,151 B2 * | 9/2015 | Beppu | B60R 21/213 |
| 9,487,175 B2 * | 11/2016 | Noma | B60R 21/214 |
| 2004/0000775 A1 * | 1/2004 | Henderson | B60R 21/201 280/730.2 |

* cited by examiner

*Primary Examiner* — Laura Freedman
(74) *Attorney, Agent, or Firm* — Tarolli, Sundheim, Covell & Tummino LLP

(57) ABSTRACT

A curtain airbag module for helping to protect an occupant of a vehicle includes an airbag package including a curtain airbag configured to inflate between a side structure of the vehicle and the vehicle occupant. The airbag package also includes an airbag wrap that packages the curtain airbag in a stored condition and is configured to rupture and release the curtain airbag for deployment in response curtain airbag inflation. The curtain airbag module also includes a deployment ramp including a ramp portion for helping to direct the curtain airbag to deploy inboard of the side structure. The deployment ramp also includes retainer portions, spaced along its length, that are configured for insertion into retainer slots in the airbag wrap to connect the airbag package to the deployment ramp.

17 Claims, 7 Drawing Sheets

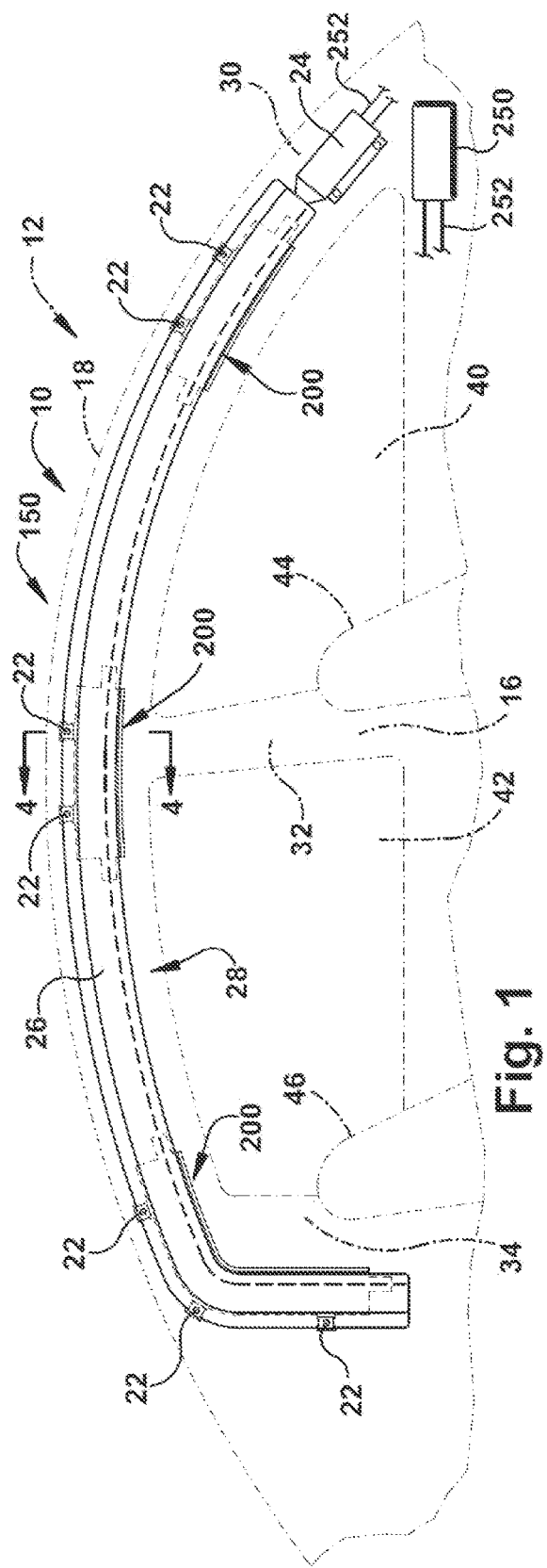

CURTAIN AIRBAG MODULE WITH DEPLOYMENT RAMP AND BAG WRAP RETENTION FEATURES

TECHNICAL FIELD

This disclosure to an inflatable apparatus for helping to protect a vehicle occupant in the event of a side impact to the vehicle and/or a vehicle rollover. More specifically, this disclosure relates to a curtain airbag module including an airbag deployment ramp with bag wrap retention features.

BACKGROUND

It is known to inflate an inflatable vehicle occupant protection device to help protect a vehicle occupant. One particular type of inflatable vehicle occupant protection device is a curtain airbag. The curtain airbag is inflatable away from the roof of the vehicle between a vehicle occupant and the side structure of the vehicle in response to a side impact to the vehicle and/or a vehicle rollover. A known curtain airbag is inflated from a deflated condition with inflation fluid directed from an inflator to the curtain airbag.

When installed in a vehicle, curtain airbags are stored behind vehicle interior trim pieces. During deployment, care must be exercised to ensure that the curtain airbag deploys over the trim pieces, i.e., inboard of the trim pieces between the trim pieces and the vehicle occupants. Deployment ramps can be implemented in order to help direct the curtain airbag to deploy inboard of the trim pieces.

SUMMARY

An airbag module includes a curtain airbag and a deployment ramp configured to direct the airbag to deploy inboard of a vehicle trim piece. The airbag module also includes an airbag wrap for packaging the curtain airbag in a stowed condition in which the airbag is rolled and/or folded prior to deployment. The airbag wrap is configured to rupture or otherwise open, e.g., via a tear seam, in response to inflation of the curtain airbag, permitting the curtain airbag to inflate and deploy under the direction of the deployment ramp.

The airbag wrap includes openings for receiving tabs on the deployment ramp. The tabs, when received in the openings, connect the airbag wrap, and the curtain airbag packaged therein, to the deployment ramp. The connection between the airbag wrap and the deployment ramp is advantageous in that it facilitates installation of the airbag module as a pre-assembled unit. The connection also avoids the use of tape, which is conventionally used to connect the packaged airbag to the deployment ramp. The tape used is typically weak so as not to inhibit deployment of the curtain airbag. As such, the tape can be prone to tearing as the module is maneuvered during installation, which disconnects the airbag package from the ramp. Utilizing the tab-opening connection disclosed herein allows for a more robust connection due to the strength of the airbag wrap material while, at the same time promoting uninhibited airbag deployment, as the airbag wrap is configured to rupture upon airbag inflation.

A curtain airbag module for helping to protect an occupant of a vehicle includes an airbag package including a curtain airbag configured to inflate between a side structure of the vehicle and the vehicle occupant. The airbag package also includes an airbag wrap that packages the curtain airbag in a stored condition and is configured to rupture and release the curtain airbag for deployment in response curtain airbag inflation. The curtain airbag module also includes a deployment ramp including a ramp portion for helping to direct the curtain airbag to deploy inboard of the side structure. The deployment ramp also includes retainer portions, spaced along its length, that are configured for insertion into retainer slots in the airbag wrap to connect the airbag package to the deployment ramp.

According to one aspect, the retainer portions can be configured as opposite end portions of the deployment ramp. The retainer portions can include tabs that extend from opposite ends of the deployment ramp.

According to another aspect, the deployment ramp can include a base wall for being positioned adjacent the vehicle side structure and a ramp portion that extends from the base wall. The retainer portions can be configured as opposite end portions of the ramp portion. The retainer portions can include tabs that extend from opposite ends of the ramp portion.

According to another aspect, the deployment ramp can include a mounting portion that extends from an edge of the base wall. The mounting portion can be configured to receive at least one fastener for connecting the curtain airbag module to the vehicle.

According to another aspect, the curtain airbag can include at least one mounting tab configured to overlie the mounting portion of the deployment ram. The at least one mounting tab can be configured to receive the at least one fastener so that the at least one fastener connects both the curtain airbag and the deployment ramp to the vehicle.

According to another aspect, the airbag wrap can include at least one mounting tab configured to overlie the at least one mounting tab of the curtain airbag and the mounting portion of the deployment ramp. The at least one mounting tab of the airbag wrap can be configured to receive the at least one fastener so that the at least one fastener connects the curtain airbag, the deployment ramp, and the airbag wrap to the vehicle.

According to another aspect, the mounting portion can project from an upper edge of the base wall of the deployment ramp. The at least one mounting tab can project from an upper edge of the mounting portion.

According to another aspect, the at least one mounting tab can project from an upper edge of the base wall of the deployment ramp.

According to another aspect, the base wall and the ramp portion can help define a channel for receiving and supporting the curtain airbag package.

According to another aspect, the retainer slots can be spaced along the length of the airbag wrap. The distance between the retainer slots can be configured to be less than the distance between terminal ends of the retainer portions of the deployment ramp.

According to another aspect, a difference in the distance between terminal ends of the retainer portions of the deployment ramp and the distance between the retainer slots can be configured to be about equal to the length of one of the retainer portions of the deployment ramp.

According to another aspect, a difference in the distance between terminal ends of the retainer portions of the deployment ramp and the distance between the retainer slots can be configured to be greater than the length of one of the retainer portions of the deployment ramp.

According to another aspect, the curtain airbag module can also include an inflator that is actuatable to direct inflation fluid into the curtain airbag to inflate and deploy the curtain airbag. The inflator can be connected to the airbag.

According to another aspect, a vehicle safety system can include the airbag module, as well as a sensor for sensing vehicle conditions, and a controller that is operative to receive a signal from the sensor that is indicative of the sensed vehicle conditions. The controller can be operative to evaluate the signal from the sensor to identify vehicle crash conditions and to control the actuation of the inflator to inflate and deploy the curtain airbag in response to the identified vehicle crash conditions.

DRAWINGS

The foregoing and other features of the present disclosure will become apparent to one skilled in the art to which the present disclosure relates upon consideration of the following description with reference to the accompanying drawings, in which:

FIG. 1 is a schematic view of an apparatus for helping to protect a vehicle occupant illustrating the apparatus in a deflated and stored condition in a vehicle, according to the present invention;

FIG. 2 is a schematic view of the apparatus of FIG. 1 in an inflated condition in the vehicle;

Figure 6A:
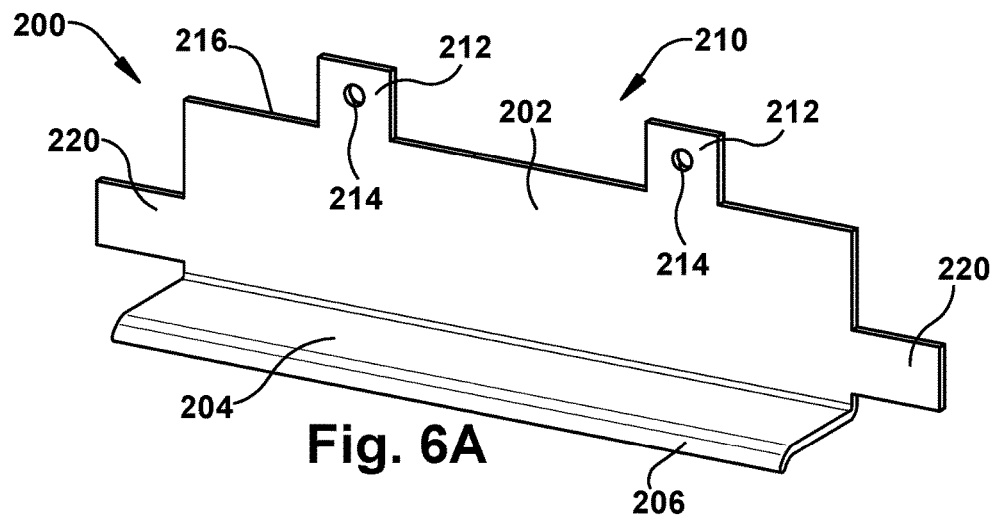
Figure 6B:
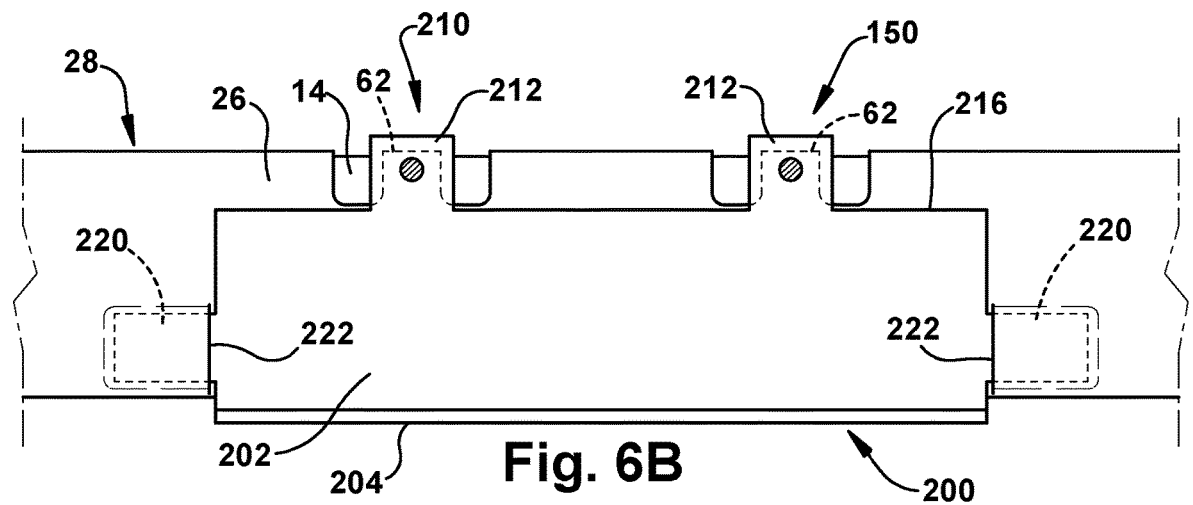
Figure 7A:
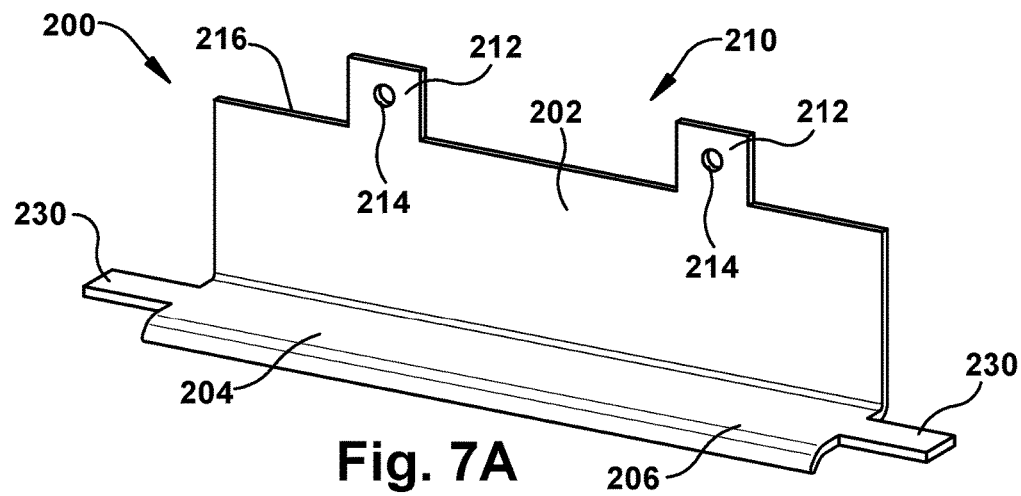
Figure 7B:
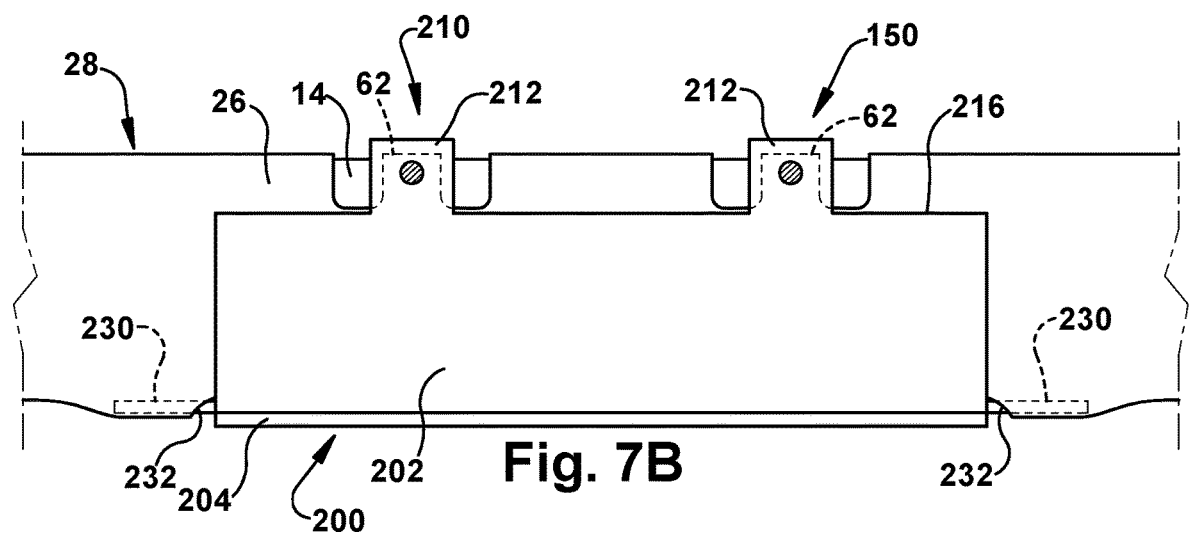

FIGS. 6A-B illustrate one example configuration of the apparatus;

FIGS. 7A-B illustrate another example configuration of the apparatus; and

Figure 8A:
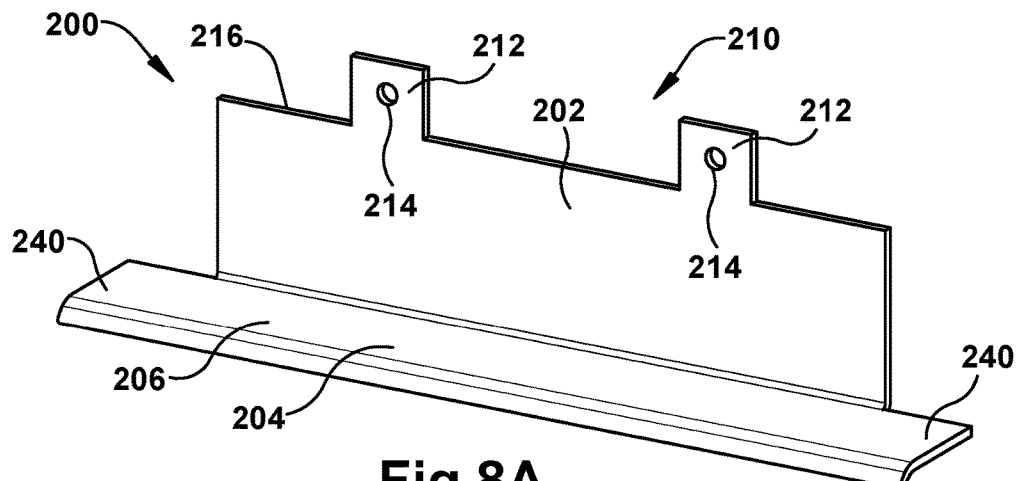
Figure 8B:
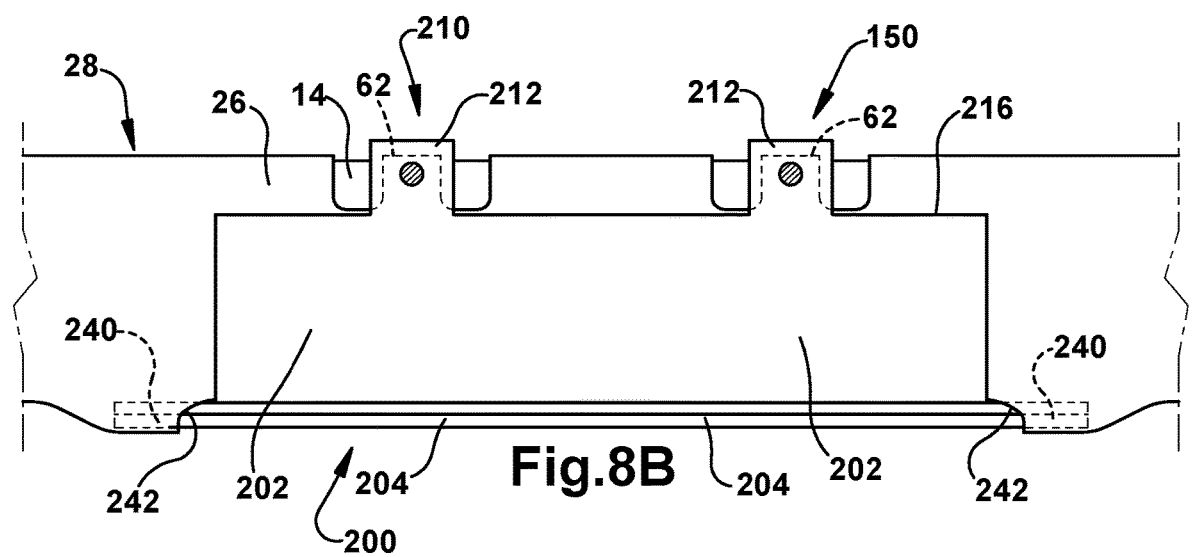

FIGS. 8A-B illustrate another example configuration of the apparatus.

DETAILED DESCRIPTION

An example configuration of an apparatus 10 for helping to protect an occupant of a vehicle 12 is shown in FIGS. 1 and 2. The apparatus 10 includes an inflatable vehicle occupant protection device in the form of a curtain airbag 14 that is mounted adjacent the side structure 16 of the vehicle 12 and the roof 18 of the vehicle. The side structure 16 of the vehicle 12 includes an A pillar 30, a B pillar 32, a C pillar 34, and front and rear side windows 40 and 42. The vehicle 12 also includes front vehicle seating 44 positioned adjacent the front side window 40 and rear vehicle seating 46 positioned adjacent the rear side window 42. This configuration is by way of example only. The vehicle 12 can have any configuration that implements a curtain airbag.

An inflator 24 is connected in fluid communication with the curtain airbag 14. The inflator 24 contains a stored quantity of pressurized inflation fluid in the form of a gas for inflating the curtain airbag 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the curtain airbag 14.

The apparatus 10 also includes an airbag cover or wrap 26 (FIG. 1), such as a woven or nonwoven fabric sheath, that packages and helps support the curtain airbag 14 in a stored and deflated condition. The deflated curtain airbag 14 and the airbag wrap 26 have an elongated configuration and extend along the vehicle roof 18 and along the side structure 16 of the vehicle 12 above the side windows 40 and 42. The curtain airbag 14 is connected to the vehicle 12 by fastening structures 22 spaced along an upper edge portion 70 of the curtain airbag.

The curtain airbag 14 (FIG. 3) includes panels 50 and 52 of material that are arranged in an overlying manner. Overlapping portions of the panels 50 and 52 are interconnected along at least a portion of a perimeter 54 of the curtain airbag 14 to form a perimeter connection 56 of the curtain. The perimeter connection 56 helps define an inflatable volume of the curtain airbag 14. The curtain airbag 14 may also include interior connections (not shown) in which the overlying panels 50 and 52 are interconnected within the perimeter 54 to form non-inflatable portions that help define inflatable chambers of the curtain.

The curtain airbag 14 may be formed in a variety of manners, such as by weaving the overlying panels 50 and 52 in a one piece woven (OPW) construction in which yarns (e.g., nylon yarns) are woven simultaneously to form both one layer and two layer portions of the airbag. The curtain airbag 14 could alternatively be formed from separately woven panels that are interconnected, for example, by stitching, ultrasonic welding, heat bonding, or adhesives. The curtain airbag 14 may be coated with a gas impermeable material, such as urethane, or laminated with a gas impermeable film. The curtain airbag 14 thus may have a substantially gas-tight construction. Those skilled in the art will appreciate that alternative materials, such as polyester yarn, and alternatives coatings, such as silicone, can also be used to construct the curtain airbag 14.

The perimeter 54 of the curtain airbag 14 is defined at least partially by an upper edge 70, an opposite lower edge 72 of the curtain, and front and rear portions 74 and 76, respectively, of the curtain airbag spaced apart horizontally along the upper and lower edges. The front and rear portions 74 and 76 of the curtain airbag 14 include front and rear edges 80 and 82, respectively, that are spaced horizontally apart along the upper and lower edges 70 and 72 and extend between the upper and lower edges. The shape and dimensions of the curtain airbag 14 can, of course, vary, depending on factors such as the architecture of the vehicle and the desired coverage of the airbag.

Figure 3:
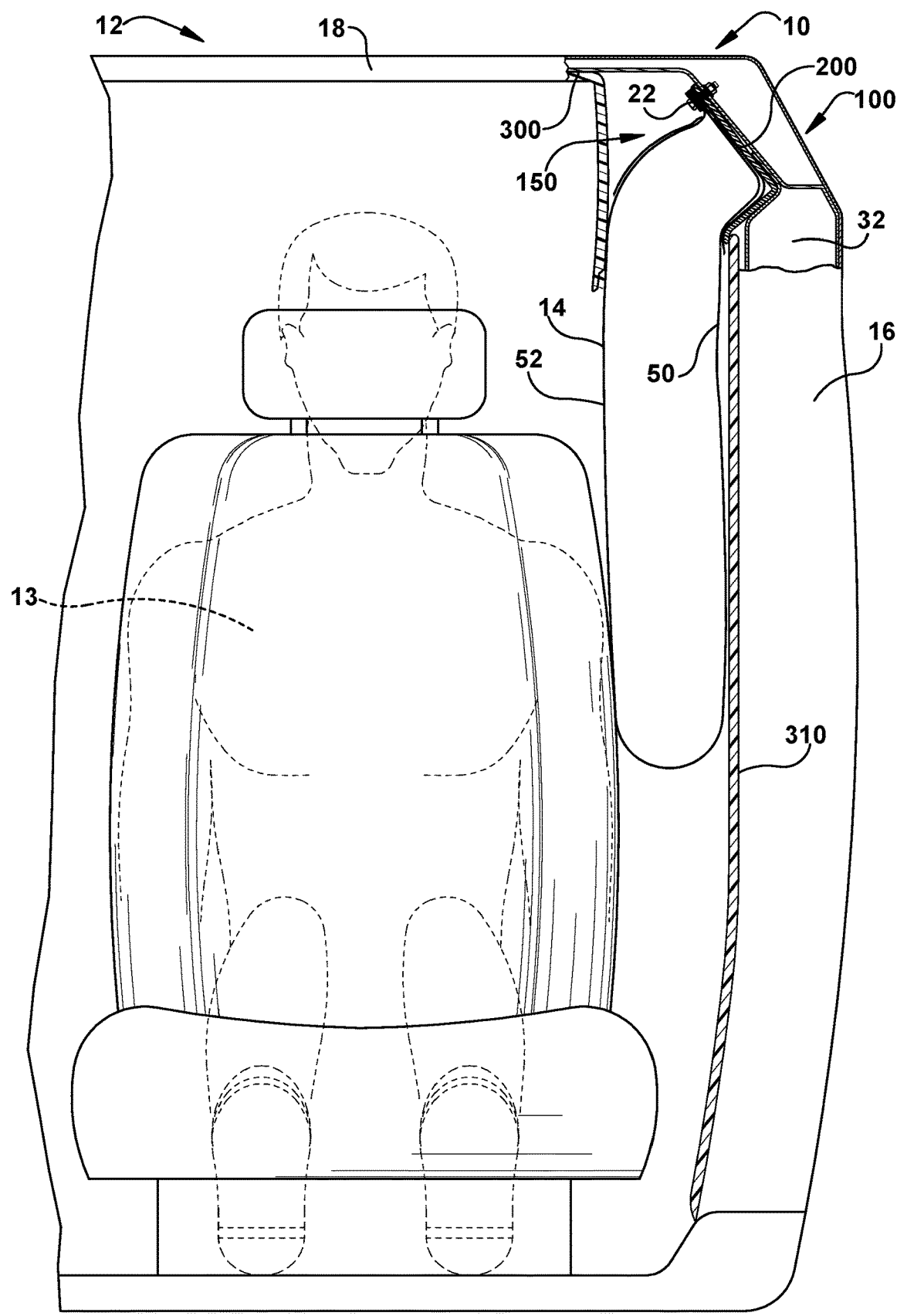
FIG. 3 is a sectional view taken generally along line 3-3 in FIG. 2.
Figure 4:
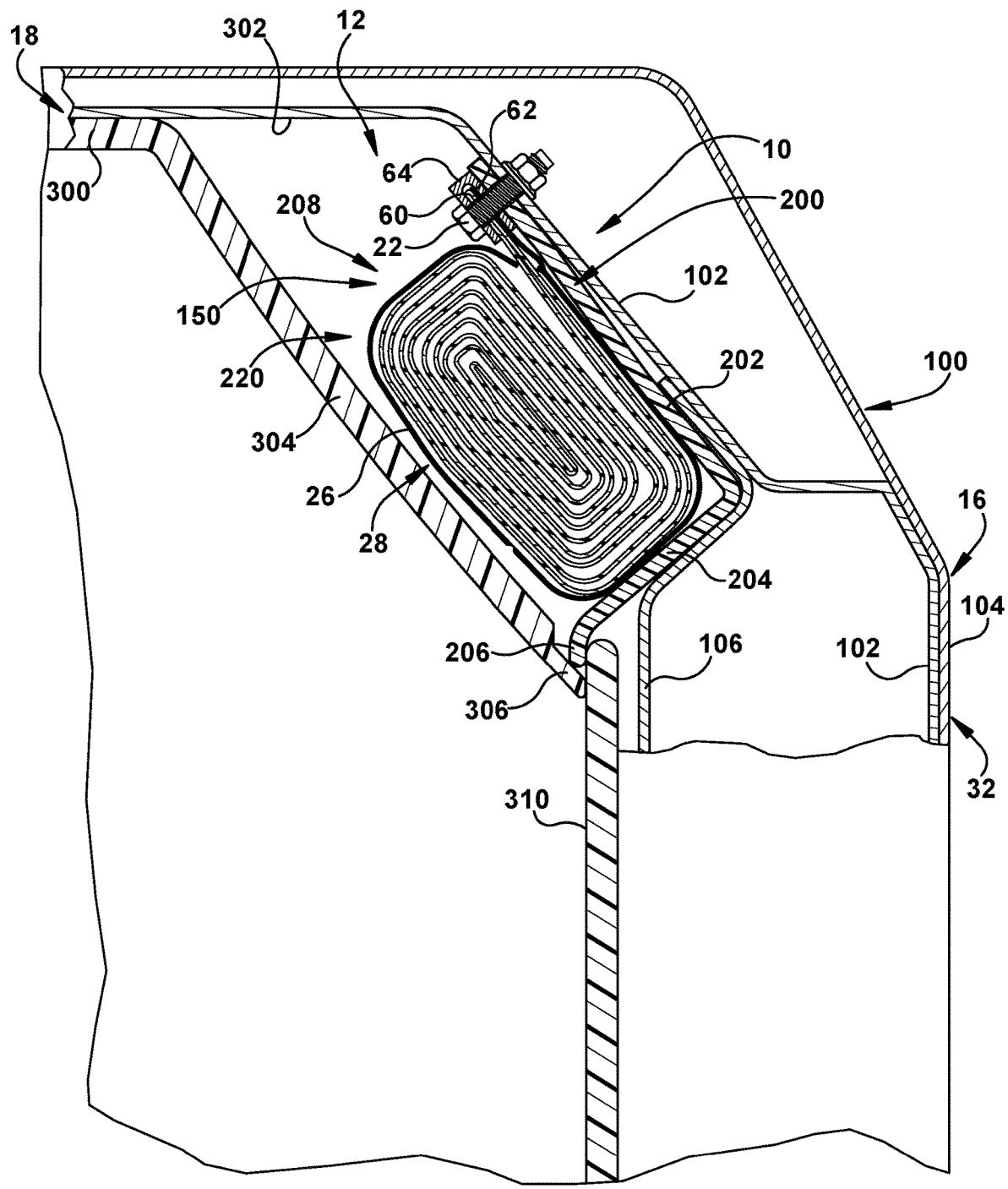
FIG. 4 is a sectional view taken generally along line 4-4 in FIG. 1.
Figure 5:
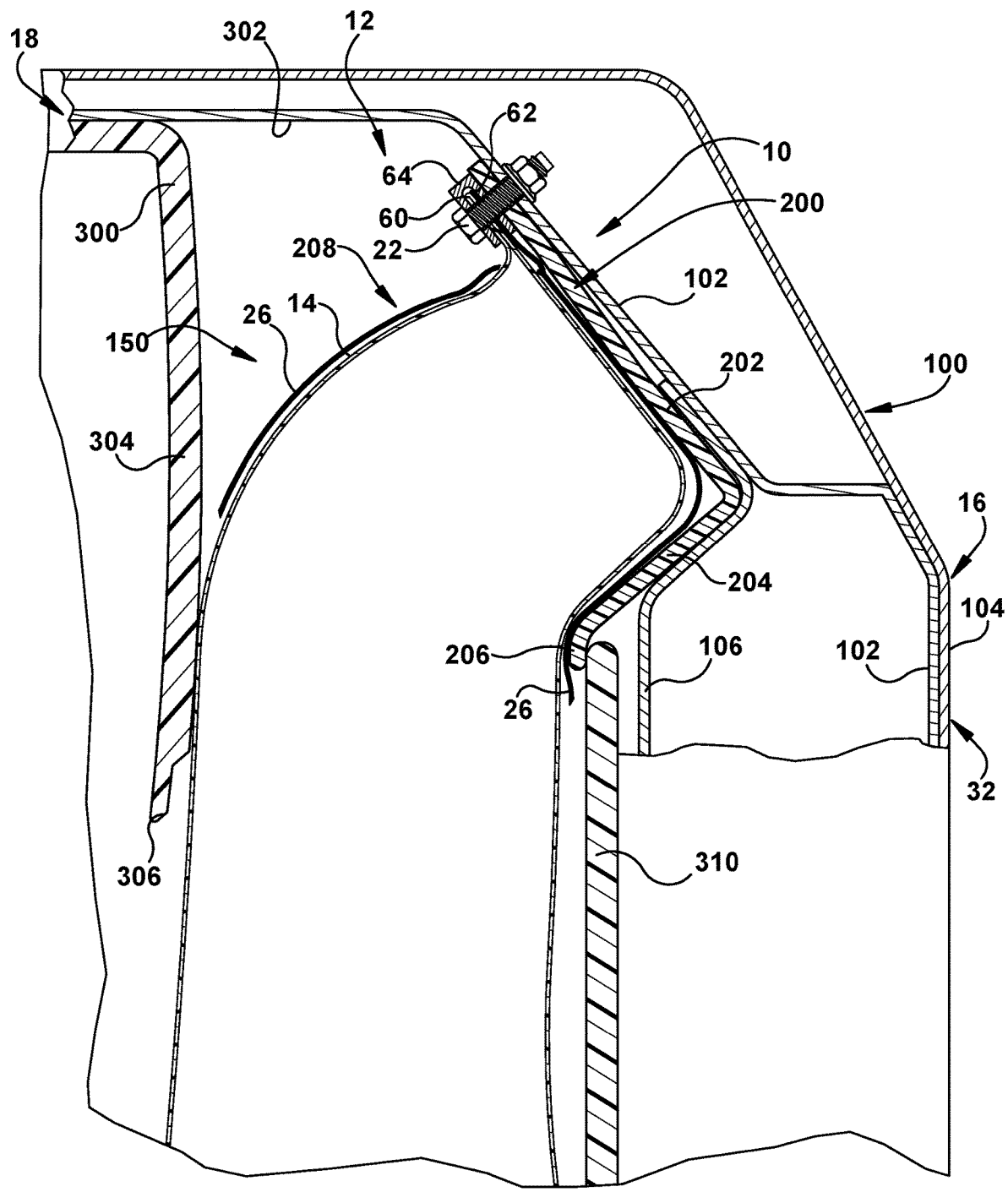
FIG. 5 is a sectional view taken generally along line 5-5 in FIG. 2.

As illustrated in FIGS. 3-5, a vehicle roof rail 100 is located at the intersection of the side structure 16 of the vehicle 12 and the vehicle roof 18. The side structure 16, roof 18, and roof rail 100 are formed from pieces of sheet metal that are stamped or otherwise formed into predetermined shapes and welded or otherwise connected to form a desired vehicle structure. As best shown in FIGS. 4 and 5, inner and outer pieces of sheet metal 102 and 104, respectively, are used to form the side structure 16, roof 18, and roof rail 100. A third piece of sheet metal 106 helps to form the B pillar 32 of the vehicle 12. Those skilled in the art will, however, appreciate that the side structure 16, roof 18, roof rail 100, and B pillar 32 may have alternative constructions.

The curtain airbag 14, inflator 24, and airbag wrap 26 can be assembled as an airbag module 150 that can be installed in the vehicle 12 as a unit. The airbag module 150 is connected to the vehicle 12 by the fasting structures 22. The airbag module 150 also includes a deployment ramp 200 positioned adjacent the roof rail 100 and the B pillar 32, as best depicted in FIGS. 4-5. The airbag module 150 can also include deployment ramps 200 positioned adjacent the roof rail 100 and the A-pillar 30, and/or adjacent the roof rail and the C-pillar 34 (see FIG. 1). The configuration of the deployment ramps 200 at each pillar location can vary, for example, to accommodate the vehicle architecture at that location. For example, as shown in FIGS. 1 and 2, the deployment ramp 200 can be configured to follow a portion of the C-pillar 34 and can have a corresponding inverted, generally L-shaped configuration. This configuration can, for example, be implemented in order to facilitate a direct or tethered connection 36 of the curtain airbag 14 to the C-pillar 34.

The deployment ramp 200 helps maintain and support the curtain airbag 14 in a stowed condition prior to deployment, and helps direct the curtain airbag during deployment. In the stowed condition, the curtain airbag 14 is rolled, folded, or a combination of rolled and folded, and packaged in the airbag wrap 26. The airbag package 28, which includes the rolled and/or folded curtain airbag 14 and surrounding airbag wrap 26 is connected to the deployment ramps 200 and to the inflator 24, thus forming the airbag module 150, which can be installed in the vehicle 12 as a unit. Fastening structures 22 can also be pre-assembled with the curtain airbag 14, inflator 24, airbag wrap 26, and deployment ramps 200, and can therefore be components of the airbag module 150.

The deployment ramp 200 includes a base wall 202 and a ramp portion 204 that extends transversely from the base wall. As shown in FIGS. 4 and 5, the ramp portion 204 can include a curved or otherwise downturned terminal edge portion 206. This configuration is by way of example only, and it will be appreciated that any component portion of the deployment ramp 200, including the base wall 202, the ramp portion 204, and the terminal edge portion 206, can vary, perhaps even significantly, depending on the architecture of the vehicle 12. In fact, portions such as the terminal edge portion 206 can even be omitted altogether in certain configurations where those portions are not necessary to cause the desired curtain airbag deployment.

Referring to FIG. 4, viewed from the side, the example configuration of the deployment ramp 200 has a generally rectangular, L-shaped configuration, defining a channel 208, which receives and supports the airbag package 28. This shape is not limiting, as the deployment ramp 200 can have any configuration tailored to cooperate with the architecture of the vehicle in which it is installed and/or the configuration of the airbag module 150 or the component(s) thereof.

FIGS. 6A-B, 7A-B, and 8A-B illustrate different example configurations of the deployment ramp 200. The deployment ramp 200 of FIGS. 6A-B includes a mounting portion 210 located along an upper edge 216 of the base wall 202. The mounting portion 210 includes a pair of mounting tabs 212, each of which includes at least one fastener aperture 214. In FIGS. 6A-B, the mounting tabs 212 extend from the base wall 202. The mounting portion 210 is therefore formed by the mounting tabs 212 alone. The mounting portion 210 could, however, include additional structure, such as an extension from the base wall 202 from which the mounting tabs 212 extend. Such additional structure can be made necessary due to the unique architectural features of the vehicle that the deployment ramp 200 must accommodate. The specific configuration of the mounting portion 210 and/or the mounting tabs 212 can depend upon the configuration/architecture of the vehicle 12 and/or the configuration of the airbag package 28, i.e., the curtain airbag 14 and/or the airbag wrap 26.

The deployment ramp 200 and curtain airbag 14 are configured to cooperate with each other to provide an advantageous mounting of the airbag module 150 in the vehicle 12. In the example configuration of FIGS. 6A-B, the deployment ramp 200 includes retainer portions 220 at opposite ends of the base wall 202. The retainer portions 220 are configured to cooperate with the airbag wrap 26 to connect the airbag package 28 to the deployment ramp 200. Specifically, the airbag wrap 26 includes spaced retainer slots 222 (see, FIG. 6B) configured to receive the retainer portions 220 of the deployment ramp 200 to connect the airbag package 28 to the ramp. The retainer slots 222 are cut through the material of the airbag wrap 26 generally perpendicularly with respect to the length of the airbag wrap and airbag package 28.

The retainer portions 220 can have various configurations. For example, in the example configuration of FIGS. 6A-B, the retainer portions 220 can be in the form of generally rectangular tabs that extend from opposite terminal ends of the base wall 202, as shown in FIGS. 6A-B. Alternatively, the retainer portions 220 could be rounded or have a different shape configured to cooperate with the slots 222.

The spacing of the retainer slots 222 is selected to be shorter than the distance between terminal ends of the retainer portions 220. Because of this, when the retainer portions 220 are installed in the retainer slots 222, the airbag package 28 cannot easily become disconnected from the deployment ramp 200. To facilitate attaching the airbag package 28 to the deployment ramp 200, the spacing of the retainer slots 222 can be selected so that fully inserting a first one of the retainer portions 220 into one slot places the other retainer slot in a position for insertion of the other retainer portion. In this configuration, the difference between the spacing of the retainer slots 222 and the distance between terminal ends of the retainer portions 220 would be the length of one deployment portion.

In another configuration, the deployment ramp 200 can be configured so that the retainer portions 220 can bend or otherwise deflect in order to insert the retainer portions in the retainer slots 222. In this configuration, the deployment ramp 200 is constructed of a material, such as plastic, that is flexible, but also can be tailored to have a desired degree of resiliency or stiffness. The deployment ramp 200 can therefore be configured to bend/deflect in order to connect with the airbag package 28 via the mounting portions 220 and slots 222 while, at the same time, can contain/support the airbag package 28 and deflect the curtain airbag 14 during deployment.

The configuration of the mounting portion 210 and the mounting tabs 212 can be configured to cooperate with the configuration of the airbag package 28 in order to facilitate simultaneously connecting the deployment ramp 200 and the airbag package to the vehicle. For example, the curtain airbag 14 and/or the airbag wrap 26 can include their own mounting tabs 60, 62 (see, e.g., FIGS. 4 and 5) configured to overlie each other and connect the airbag package 28 to the vehicle 12. Optionally, a bracket 64 can also be used to facilitate the connection. The mounting portion 210 can be configured so that the curtain/wrap mounting tabs 60 are positioned overlying the ramp mounting tabs 212 when the deployment ramp 200 is connected to the airbag package 28.

With this configuration, the fasteners used to connect the airbag module 150 to the vehicle 12 can therefore extend through the curtain airbag 14, the airbag wrap 26, and the deployment ramp 200. This connection, reinforced by the mounting tabs 212, can therefore be strong and robust to the forces (e.g., deployment and impact forces) undergone by the curtain airbag 14 during use. The mounting tabs 212 can, however, provide sufficient reinforcement to allow for supporting the module 150 without requiring any further reinforcing structures. Nevertheless, additional structures, such as clamps or brackets could also be implemented to reinforce the connection of the airbag module 150 to the vehicle 12, depending on the particular circumstances involved with the installation.

Like the deployment ramp of FIGS. 6A-B, the deployment ramp 200 of FIGS. 7A-B includes a mounting portion 210 located along an upper edge 216 of the base wall 202. The mounting portion 210 includes a pair of mounting tabs 212, each of which includes at least one fastener aperture 214. In FIGS. 7A-B, the mounting tabs 212 extend from the base wall 202. The mounting portion 210 is therefore formed by the mounting tabs 212 alone. The mounting portion 210 could, however, include additional structure, such as an extension from the base wall 202 from which the mounting tabs 212 extend. Such additional structure can be made necessary due to the unique architectural features of the vehicle that the deployment ramp 200 must accommodate. The specific configuration of the mounting portion 210 and/or the mounting tabs 212 can depend upon the configuration/architecture of the vehicle 12 and/or the configuration of the airbag package 28, i.e., the curtain airbag 14 and/or the airbag wrap 26.

The deployment ramp 200 and curtain airbag 14 are configured to cooperate with each other to provide an advantageous mounting of the airbag module 150 in the vehicle 12. In the example configuration of FIGS. 7A-B, the deployment ramp 200 includes retainer portions 230 at opposite ends of the ramp portion 202. The retainer portions 230 are configured to cooperate with the airbag wrap 26 to connect the airbag package 28 to the deployment ramp 200. Specifically, the airbag wrap 26 includes spaced retainer slots 232 (see, FIG. 6B) configured to receive the retainer portions 230 of the deployment ramp 200 to connect the airbag package 28 to the ramp. The retainer slots 232 are cut through the material of the airbag wrap 26 generally perpendicularly with respect to the length of the airbag wrap and airbag package 28.

The retainer portions 230 can have various configurations. For example, in the example configuration of FIGS. 7A-B, the retainer portions 230 can be in the form of generally rectangular tabs that extend from opposite terminal ends of the ramp portion 204, as shown in FIGS. 7A-B. Alternatively, the retainer portions 230 could be rounded or have a different shape configured to cooperate with the slots 232.

The spacing of the retainer slots 232 is selected to be shorter than the distance between terminal ends of the retainer portions 230. Because of this, when the retainer portions 230 are installed in the retainer slots 232, the airbag package 28 cannot easily become disconnected from the deployment ramp 200. To facilitate attaching the airbag package 28 to the deployment ramp 200, the spacing of the retainer slots 232 can be selected so that fully inserting a first one of the retainer portions 230 into one slot places the other retainer slot in a position for insertion of the other retainer portion. In this configuration, the difference between the spacing of the retainer slots 232 and the distance between terminal ends of the retainer portions 230 would be the length of one deployment portion.

In another configuration, the deployment ramp 200 can be configured so that the retainer portions 230 can bend or otherwise deflect in order to insert the retainer portions in the retainer slots 232. In this configuration, the deployment ramp 200 is constructed of a material, such as plastic, that is flexible, but also can be tailored to have a desired degree of resiliency or stiffness. The deployment ramp 200 can therefore be configured to bend/deflect in order to connect with the airbag package 28 via the mounting portions 230 and slots 232 while, at the same time, can contain/support the airbag package 28 and deflect the curtain airbag 14 during deployment.

The configuration of the mounting portion 210 and the mounting tabs 212 can be configured to cooperate with the configuration of the airbag package 28 in order to facilitate simultaneously connecting the deployment ramp 200 and the airbag package to the vehicle. For example, the curtain airbag 14 and/or the airbag wrap 26 can include their own mounting tabs 60, 62 (see, e.g., FIGS. 4 and 5) configured to overlie each other and connect the airbag package 28 to the vehicle 12. Optionally, a bracket 64 can also be used to facilitate the connection. The mounting portion 210 can be configured so that the curtain/wrap mounting tabs 60 are positioned overlying the ramp mounting tabs 212 when the deployment ramp 200 is connected to the airbag package 28.

With this configuration, the fasteners used to connect the airbag module 150 to the vehicle 12 can therefore extend through the curtain airbag 14, the airbag wrap 26, and the deployment ramp 200. This connection, reinforced by the mounting tabs 212, can therefore be strong and robust to the forces (e.g., deployment and impact forces) undergone by the curtain airbag 14 during use. The mounting tabs 212 can, however, provide sufficient reinforcement to allow for supporting the module 150 without requiring any further reinforcing structures. Nevertheless, additional structures, such as clamps or brackets could also be implemented to reinforce the connection of the airbag module 150 to the vehicle 12, depending on the particular circumstances involved with the installation.

The deployment ramp 200 of FIGS. 8A-B includes a mounting portion 210 located along an upper edge 216 of the base wall 202. The mounting portion 210 includes a pair of mounting tabs 212, each of which includes at least one fastener aperture 214. In FIGS. 8A-B, the mounting tabs 212 extend from the base wall 202. The mounting portion 210 is therefore formed by the mounting tabs 212 alone. The mounting portion 210 could, however, include additional structure, such as an extension from the base wall 202 from which the mounting tabs 212 extend. Such additional structure can be made necessary due to the unique architectural features of the vehicle that the deployment ramp 200 must accommodate. The specific configuration of the mounting portion 210 and/or the mounting tabs 212 can depend upon the configuration/architecture of the vehicle 12 and/or the configuration of the airbag package 28, i.e., the curtain airbag 14 and/or the airbag wrap 26.

The deployment ramp 200 and curtain airbag 14 are configured to cooperate with each other to provide an advantageous mounting of the airbag module 150 in the vehicle 12. In the example configuration of FIGS. 8A-B, the deployment ramp 200 includes retainer portions 240 at opposite ends of the deployment ramp 200. In the configuration of FIGS. 8A-B, instead of tabs, the retainer portions 240 are lengths of the ramp portion 204 itself that extend beyond the extend of the base wall 202.

The retainer portions 240 are configured to cooperate with the airbag wrap 26 to connect the airbag package 28 to the deployment ramp 200. Specifically, the airbag wrap 26 includes spaced retainer slots 242 (see, FIG. 8B) configured to receive the retainer portions 240 of the deployment ramp 200 to connect the airbag package 28 to the ramp. The retainer slots 242 are cut through the material of the airbag wrap 26 generally perpendicularly with respect to the length of the airbag wrap and airbag package 28. Because the retainer portions 240 are extension of the ramp portion 204, the size of the slots 242 can be increased for their accommodation.

The spacing of the retainer slots 242 is selected to be shorter than the distance between terminal ends of the retainer portions 240. Because of this, when the retainer portions 240 are installed in the retainer slots 242, the airbag package 28 cannot easily become disconnected from the deployment ramp 200. To facilitate attaching the airbag package 28 to the deployment ramp 200, the spacing of the retainer slots 242 can be selected so that fully inserting a first one of the retainer portions 240 into one slot places the other retainer slot in a position for insertion of the other retainer portion. In this configuration, the difference between the spacing of the retainer slots 242 and the distance between terminal ends of the retainer portions 240 would be the length of one deployment portion.

In another configuration, the deployment ramp 200 can be configured so that the retainer portions 240 can bend or otherwise deflect in order to insert the retainer portions in the retainer slots 242. In this configuration, the deployment ramp 200 is constructed of a material, such as plastic, that is flexible, but also can be tailored to have a desired degree of resiliency or stiffness. The deployment ramp 200 can therefore be configured to bend/deflect in order to connect with the airbag package 28 via the mounting portions 240 and slots 242 while, at the same time, can contain/support the airbag package 28 and deflect the curtain airbag 14 during deployment.

The configuration of the mounting portion 210 and the mounting tabs 212 can be configured to cooperate with the configuration of the airbag package 28 in order to facilitate simultaneously connecting the deployment ramp 200 and the airbag package to the vehicle. For example, the curtain airbag 14 and/or the airbag wrap 26 can include their own mounting tabs 60, 62 (see, e.g., FIGS. 4 and 5) configured to overlie each other and connect the airbag package 28 to the vehicle 12. Optionally, a bracket 64 can also be used to facilitate the connection. The mounting portion 210 can be configured so that the curtain/wrap mounting tabs 60 are positioned overlying the ramp mounting tabs 212 when the deployment ramp 200 is connected to the airbag package 28.

With this configuration, the fasteners used to connect the airbag module 150 to the vehicle 12 can therefore extend through the curtain airbag 14, the airbag wrap 26, and the deployment ramp 200. This connection, reinforced by the mounting tabs 212, can therefore be strong and robust to the forces (e.g., deployment and impact forces) undergone by the curtain airbag 14 during use. The mounting tabs 212 can, however, provide sufficient reinforcement to allow for supporting the module 150 without requiring any further reinforcing structures. Nevertheless, additional structures, such as clamps or brackets could also be implemented to reinforce the connection of the airbag module 150 to the vehicle 12, depending on the particular circumstances involved with the installation.

The airbag module 150, when in the installed condition, extends along the roof rail 100 and along the intersection of the side structure 16 and the roof 18. This is best shown in FIGS. 1 and 4. The vehicle 12 includes a headliner 300 that extends along an inner surface 302 of the roof 18 of the vehicle. The headliner 300 has a portion 304 that extends at an acute angle relative to the roof 18 adjacent the airbag module 150. The portion 304 of the headliner 300 overlies the airbag module 150 and conceals the airbag module in the vehicle 12. A terminal end 306 of the headliner 300 is in abutting engagement with a trim piece 310 (FIG. 4) overlying the B pillar 32. Those having skill in the art will appreciate that the headliner 300 may also abut and engage a trim piece (not shown in FIG. 4, see FIG. 1) overlying the C pillar 34.

Those skilled in the art will recognize that the configuration of the vehicle structure and, thus, the spatial and interconnecting relationships between the vehicle structure (i.e., the side structure 16, roof 18, and roof rail 100) and the headliner 300, trim piece 310, and airbag module 150, may vary depending upon the particular design of the vehicle 12. Therefore, it should be recognized that the vehicle structure illustrated in FIGS. 4-5 and the spatial and interconnecting relationships between the vehicle structure and the headliner 300, the trim pieces 310 and 312, and the airbag module 150 are for illustrative purposes and may vary without departing from the spirit of the present invention.

The vehicle 12 includes a sensor mechanism 250 (shown schematically in FIGS. 1 and 2) for sensing the occurrence of an event for which inflation of the curtain airbag 14 is desired, such as a side impact to the vehicle 12 and/or a vehicle rollover. Upon sensing the occurrence of such an event, the sensor mechanism 250 provides an electrical signal over lead wires 252 to the inflator 24. The electrical signal causes the inflator 24 to be actuated in a known manner. The inflator 24, when actuated, discharges fluid under pressure into the curtain airbag 14.

The curtain airbag 14 inflates under the pressure of the inflation fluid from the inflator 24 and deploys away from the roof 18 in a downward direction as shown in the drawings and in a downward direction with respect to the direction of forward travel of the vehicle 12 into the position illustrated in FIGS. 2 and 5. The curtain airbag 14, when inflated, extends along the side structure 16 of the vehicle 12 and is positioned between the side structure and any occupant 13 of the vehicle. The curtain airbag 14 covers portions of the vehicle side structure that extend between the A pillar 30 and the C pillar 34 of the vehicle 12 and may overlie portions of the A pillar, C pillar, and the B pillar 32 of the vehicle. The curtain airbag 14, when inflated, may be positioned between the vehicle side structure 16 and the front and rear vehicle seating 44 and 46. The curtain airbag 14, when inflated, helps to protect a vehicle occupant 13 in the event of a vehicle rollover or a side impact to the vehicle 12. The curtain airbag 14, when inflated, also helps to absorb the energy of impacts with the curtain and helps to distribute the impact energy over a large area of the curtain.

Those skilled in the art will appreciate that the extent and coverage of the curtain airbag 14 in the vehicle 12 may vary. For example, the extent and coverage of the curtain airbag 14 may vary depending on a variety of factors, such as the architecture of the vehicle 12, the position of the curtain airbag in the vehicle, and the desired extent or coverage of the curtain airbag.

Referring to FIGS. 3-5, the deployment ramp 200 helps to deflect or otherwise direct the curtain airbag 14 to inflate inboard of the trim piece 310, between the trim piece and occupants of the vehicle 12. The ramp portion 202 helps prevent the curtain from getting caught on the trim piece or inflating between the trim piece and the side structure 16. The deployment ramp 200 directs the curtain airbag 14 to deploy in an inboard direction (i.e., to the left as viewed in FIGS. 3-5) around and inboard of the trim piece 310. The curtain airbag 14, when inflated and deployed, is therefore positioned between the side structure 16 of the vehicle 12 and the vehicle occupant 13 and between the trim piece 310 and the occupant.

From the above description of the invention, those skilled in the art will perceive improvements, changes and modifications. Such improvements, changes and modifications within the skill of the art are intended to be covered by the appended claims.

Having described the invention, the following is claimed:

1. A curtain airbag module for helping to protect an occupant of a vehicle, comprising:
    an airbag package comprising a curtain airbag configured to inflate between a side structure of the vehicle and the vehicle occupant and an airbag wrap that packages the curtain airbag in a stored condition and is configured to rupture and release the curtain airbag for deployment in response to curtain airbag inflation; and
    a deployment ramp comprising a ramp portion for helping to direct the curtain airbag to deploy inboard of the side structure and retainer portions spaced along its length, the retainer portions being configured for insertion into retainer slots in the airbag wrap to connect the airbag package to the deployment ramp.

2. The curtain airbag module recited in claim 1, wherein the retainer portions are configured as opposite end portions of the deployment ramp.

3. The curtain airbag module recited in claim 1, wherein the retainer portions comprise tabs that extend from opposite ends of the deployment ramp.

4. The curtain airbag module recited in claim 1, wherein the deployment ramp comprises a base wall for being positioned adjacent the vehicle side structure and a ramp portion that extends from the base wall.

5. The curtain airbag module recited in claim 4, wherein the retainer portions are configured as opposite end portions of the ramp portion.

6. The curtain airbag module recited in claim 4, wherein the retainer portions comprise tabs that extend from opposite ends of the ramp portion.

7. The curtain airbag module recited in claim 4, wherein the deployment ramp further comprises a mounting portion that extends from an edge of the base wall, the mounting portion being configured to receive at least one fastener for connecting the curtain airbag module to the vehicle.

8. The curtain airbag module recited in claim 7, wherein the curtain airbag comprises at least one mounting tab configured to overlie the mounting portion of the deployment ramp, the at least one mounting tab being configured to receive the at least one fastener so that the at least one fastener connects both the curtain airbag and the deployment ramp to the vehicle.

9. The curtain airbag module recited in claim 8, wherein the airbag wrap comprises at least one mounting tab configured to overlie the at least one mounting tab of the curtain airbag and the mounting portion of the deployment ramp, the at least one mounting tab of the airbag wrap being configured to receive the at least one fastener so that the at least one fastener connects the curtain airbag, the deployment ramp, and the airbag wrap to the vehicle.

10. The curtain airbag module recited in claim 8, wherein the mounting portion projects from an upper edge of the base wall of the deployment ramp and the at least one mounting tab projects from an upper edge of the mounting portion.

11. The curtain airbag module recited in claim 8, wherein the at least one mounting tab projects from an upper edge of the base wall of the deployment ramp.

12. The curtain airbag module recited in claim 4, wherein the base wall and the ramp portion help define a channel for receiving and supporting the airbag package.

13. The curtain airbag module recited in claim 1, wherein the retainer slots are spaced along the length of the airbag wrap, the distance between the retainer slots being configured to be less than the distance between terminal ends of the retainer portions of the deployment ramp.

14. The curtain airbag module recited in claim 13, wherein a difference in the distance between terminal ends of the retainer portions of the deployment ramp and the distance between the retainer slots is configured to be about equal to the length of one of the retainer portions of the deployment ramp.

15. The curtain airbag module recited in claim 13, wherein a difference in the distance between terminal ends of the retainer portions of the deployment ramp and the distance between the retainer slots is configured to be greater than the length of one of the retainer portions of the deployment ramp.

16. The curtain airbag module recited in claim 1, further comprising an inflator that is actuatable to direct inflation fluid into the curtain airbag to inflate and deploy the curtain airbag, wherein the inflator is connected to the airbag.

17. A vehicle safety system comprising the curtain airbag module of claim 16, a sensor for sensing vehicle conditions, and a controller that is operative to receive a signal from the sensor that is indicative of the sensed vehicle conditions, the controller being operative to evaluate the signal from the sensor to identify vehicle crash conditions and to control the actuation of the inflator to inflate and deploy the curtain airbag in response to the identified vehicle crash conditions.

* * * * *